United States Patent [19]

Loudin et al.

[11] 4,263,833
[45] Apr. 28, 1981

[54] REMOVABLE ONE-PIECE DRIVE RIVET

[75] Inventors: Philip B. Loudin, Palos Hills; John F. Nelson, New Lenox, both of Ill.

[73] Assignee: Illinois Tool Works Inc., Chicago, Ill.

[21] Appl. No.: 39,417

[22] Filed: May 15, 1979

[51] Int. Cl.³ .............................................. F16B 13/04
[52] U.S. Cl. ...................................... 411/41; 411/55; 411/60
[58] Field of Search ................... 85/72, 80, 81, 84, 83, 85/82; 24/73 P, 73 PF, 73 PM

[56] References Cited

U.S. PATENT DOCUMENTS

| | | | |
|---|---|---|---|
| 3,136,350 | 6/1964 | Rapata | 85/80 |
| 3,200,694 | 8/1965 | Rapata | 85/82 |
| 3,358,551 | 12/1967 | Seckerson | 85/80 |
| 3,385,157 | 5/1968 | Rapata | 85/72 X |
| 3,505,921 | 4/1970 | Wigam | 85/72 X |
| 3,662,644 | 5/1972 | Flesch et al. | 85/84 X |
| 3,803,973 | 4/1974 | Rapata | 85/80 |
| 4,070,945 | 1/1978 | Kurosaki | 85/82 |
| 4,082,030 | 4/1978 | Erickson | 85/80 |

FOREIGN PATENT DOCUMENTS

| | | | |
|---|---|---|---|
| 996455 | 6/1965 | United Kingdom | 85/80 |
| 1229098 | 4/1971 | United Kingdom | 85/84 |

*Primary Examiner*—Ramon S. Britts
*Attorney, Agent, or Firm*—Thomas W. Buckman; Jack R. Halvorsen

[57] ABSTRACT

A removable one-piece plastic drive rivet for use in an apertured work piece including a head having a depending bifurcated shank and a threaded drive pin which can be driven into a through-bore by an axial blow which expands the shank behind the panel and can be removed therefrom by rotation of the drive pin.

15 Claims, 10 Drawing Figures

U.S. Patent      Apr. 28, 1981      4,263,833
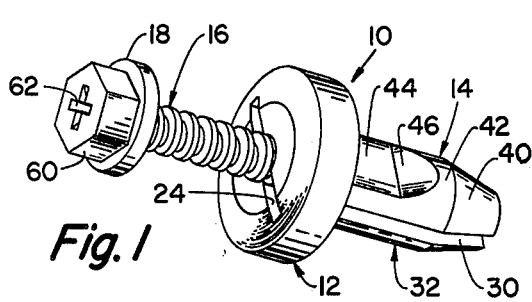
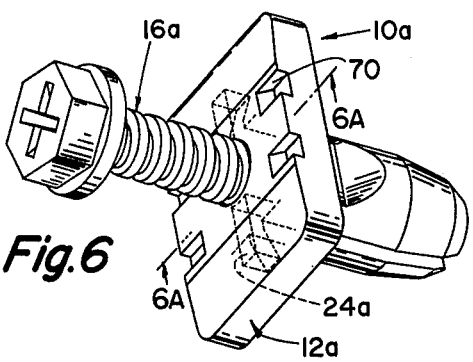
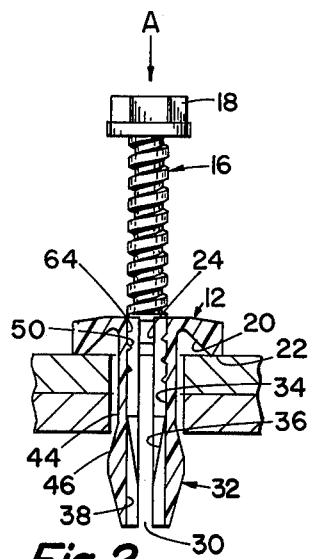
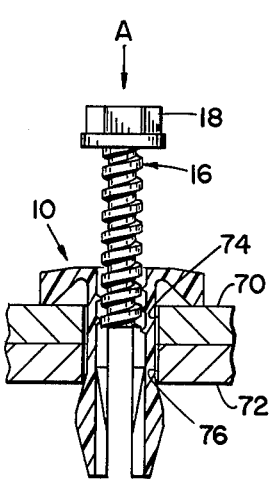
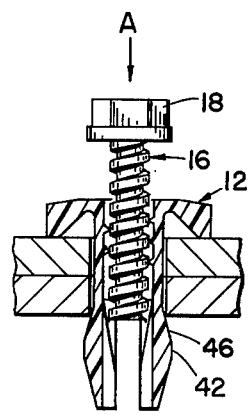
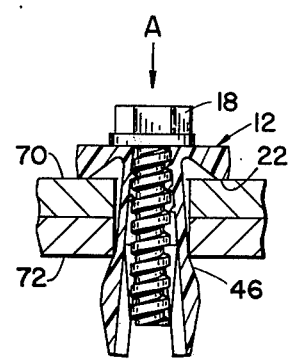
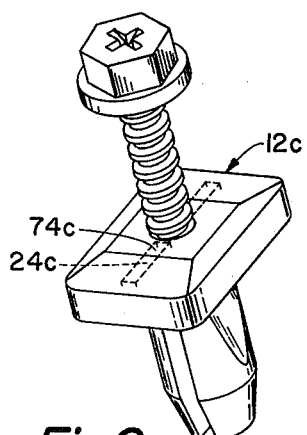
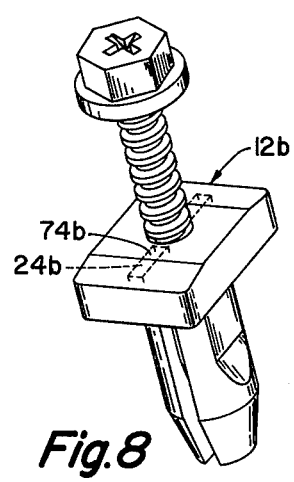
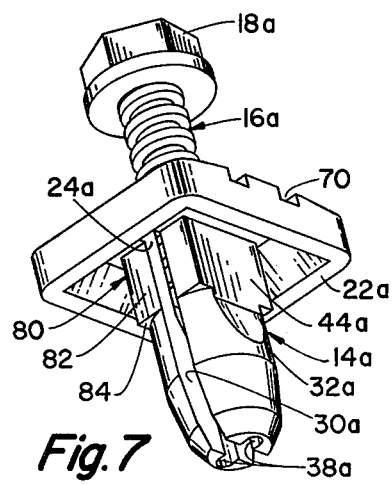
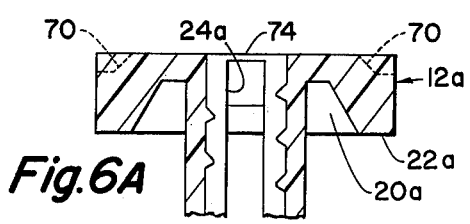

REMOVABLE ONE-PIECE DRIVE RIVET

BACKGROUND OF THE INVENTION

The prior art is replete with examples of rivet like members having a head with two or more depending shank portions that are insertable through an apertured work piece and expanded by a drive pin inserted into a through-bore passing through the head and between the sections of the shank. A common problem with the early versions of such rivets was the loss of drive pins through fracture and failure to be properly inserted in a like number of rivets. With the advent of injection molding it was found that it was possible to mold a plastic rivet having an integral drive pin connected by a frangible section at one end of the drive pin and ahead of the rivet. This is clearly shown in U.S. Pat. No. 2,402,287 issued in the name of Henry Kearns on June 18, 1946. Other related patents which have issued as improvements to the basic Kearns principle of a frangible connected drive pin are found in U.S. Letters Patent issued to Rapata U.S. Pat. No. 3,385,157; Erickson U.S. Pat. No. 4,083,289 and Koscik U.S. Pat. No. 4,085,651, each of which have features which were novel over the prior art and related to means for accomodating varying tolerances in panel thickness, hole size and locking the drive pin in the rivet.

However, none of the prior art provided a ready means for removal of the rivet and reuse of the rivet. The prior art primarily relied upon destruction of the rivet for its removal, or alternatively, did not provide a ready means for the reuse of the rivet.

SUMMARY OF THE INVENTION

The present invention is designed to overcome the principle disadvantage of conventional rivets as they relate to the problem of removability. An advantage of the present invention is that it provides for easy removal by means of a threaded drive pin which, when driven into the bifurcated shank of the rivet, engages small protuberances or ribs which are designed so as to mate with the threads on the drive pin. When removal is desired said ribs act as a nut or thread engaging member allowing the drive pin to be retracted from the prong portion of the shank by rotation of the drive pin in the manner of a conventional screw.

A further advantage of the present invention is in the design of the thread form on the drive pin in combination with the configuration of rib or protuberance for mating therewith, so that when the drive pin is subjected to an axial blow the drive pin and its associated threads will not shear off or wipe the ribs, with which it is to be associated, from the wall surface on which they are mounted.

Another feature of the present invention is the unique configuration of the rivet head which provides flexibility to the head and serves to prevent the thread wiping effect mentioned above.

Additionally, the drive pin is provided with a head that comes in connect with the surface of the rivet head and compresses it in a fashion of a spring washer at the same time that the prong is expanded and thereby retains the head in a compressed fashion. The advantage to this is that the present invention may be observed to actually generate a clamp load on the part being fastened together. This feature is not to be found in any other known plastic drive rivet. Further features of the invention will be found by those skilled in the art.

BRIEF DESCRIPTION OF THE DRAWINGS

FIG. 1 is a perspective view of a preferred embodiment of the present invention;

FIGS. 2 through 5 are elevational views in partial sections of the preferred embodiment of the present invention showing the embodiment in mounted position for purposes of capturing two apertured work pieces in juxtaposed relationship;

FIGS. 6 and 6A is a perspective view of a second embodiment of the present invention as view from its head end;

FIG. 7 is a perspective view of the embodiment shown in FIG. 6 as viewed from its prong end;

FIG. 8 and FIG. 9 are perspective views of two other embodiments of the present invention utilizing the same basic teachings but showing differing head styles.

DETAILED DESCRIPTION

The present invention is directed to overcoming the principle disadvantage of conventional rivets, namely, the problem of ready removal and if desired reuse. It provides for easy removal by means of a threaded drive pin which, when driven into the prong portion of the shank of the part engages protuberances, in the preferred embodiment small ribs, which are designed to mate with the thread on the drive pin. When removal is desired the ribs act as a nut or thread engaging means allowing the drive pin to be retracted from between the prongs of the shank by rotating the head of the drive pin in the manner of a conventional screw. A reveiw of the specific aspects of the present invention are detailed below.

The thread form utilized on the drive pin is of importance to the function of the invention. The thread is very similar in appearance to the familiar Acme form of thread, however, there is a significant difference, namely, the distance between adjacent threads at their root. The thread used in this invention has been specifically designed to increase the normal distance to provide for any thread deformation which might take place under the heavy loads born by the thread tips when the part is driven. Further, the flat surface at the tip of the thread is critical to minimize the "wiping effect" which would take place if this area was a sharp corner as in a conventional machine screw thread.

The drive pin includes a head at one end with the design of such head being a non-critical function to the effectiveness of the part. In general, a hexagonal shape is preferred so as to spread the loads applied during the removal operation as well as to provide wrenching surfaces if desired. The drive pin itself is intended to be molded integrally to the head of the part by means of a frangible section. If desired the drive pin can be pre-driven introduction.

The head of the rivet per se, may assume any external shape which is called for by a particular application. There are, however, two features which are necessary for the invention to function properly. First is a slot which extends substantially through the axial thickness of the head and extends radially from the through bore that accepts the drive pin. This slot may extend all the way through the head with its terminal ends stopping short of the perimetrial margins of the heads or alternatively, the upper surface of the head may include a thin web-like element which covers the slot. The purpose of this slot is to increase the flexibility of the prongs of the shank at their juncture with the head so as to maximize the preservation of the internal ribs in the bore during the stripping stage of the molding operation and additionally, this flexibility serves to aid in preventing the "thread wiping effect" mentioned earlier during the penetration of the drive pin into the through bore. The second significant feature of the head is the undercut or relieved portion on the under side of the head which gives it a domed shape molded therein during fabrication. This resulting structure acts in a two-fold manner, namely, to provide flexibility to the head during the driving of the screw and also to act as a spring washer when the drive pin is driven home. As the pin is driven home the underside of the pin head comes in contact with the upper surface of the rivet head compressing it in the fashion of a spring washer. Simultaneously the prong is expanded and retains the head in the compressed fashion. In this way the present invention may be observed to actually generate a clamp load on the parts being fastened together. There is no other known plastic drive rivet which offers this feature.

The general configuration of the shank portion of the present invention includes an elongated element that is bifurcated to provide at least two opposed prong sections. The prong of the present invention is generally designed to conform with the teachings of U.S. Pat. No. 4,083,289 assigned to the common assignee of the present invention. However, the present shank prongs include additional features which vastly improve the function of the present invention. Immediately adjacent the underside of the head there is provided a relief on opposite sides of the shank by means of flat sections on the prongs. When the rivet is inserted into its intended hole, these flat surfaces will not touch the perimeter of the hole except at their lower extremity where the prong is provided with ramp angles. This allows an open space between the rivet prong and the perimeter of the hole into which the prong sections containing the inner thread engaging ribs may expand when the drive pin is driven into the bore, thus providing a relief means to prevent the "thread wiping effect".

The lower extremity of the prong section are tapered to provide easy installation into the panel and thence tapered inwardy in the opposite direction to form a shoulder means with these tapered or ramp surfaces which rip the back of the panel securely to retain the clamp load generated when the pin is driven. The inner core of the prong section, in accordance with the teachings of U.S. Pat. No. 4,083,289, consists of a cylindrical section extending through the head into a substantial portion of the prongs and joined by a frustoconical section axially spaced from the head. There also is preferably a slot which intersects the frustoconical section and extends from the free end of the shank into the frustoconical section. As the pin is driven the frustoconical section provides the lateral forces for gripping the back of the panel as the prongs are moved radially outwardly. The thread engaging means in the form of the ribs are molded in the cylindrical section to allow the drive pin to be fully retracted from the conical section which allows the prong to be collapsed while at the same time the drive pin is retained in the part during a removable operation.

In the preferred form of this embodiment the thread engaging means in the form of protuberances or ribs are molded with a wider included angle, namely, 90°, then screw threads which have a 60° angle to thereby minimize the "thread wiping effect" during the stripping from the mold core and during installation and axial movement of the drive pin. Preferably the ribs are inclined at an angle so as to mate with the threads on the drive pin, such angle being the pitch of the thread.

Referring now to the drawings wherein similar numerals are utilized to designate similar parts, one embodiment of the present invention can be viewed in FIGS. 1 through 5. A rivet 10 includes a head 12, a shank 14 and a drive pin 16 having a head 18 at one end thereof. The head 12 may have any desired perimetral configuration such as the cylinder shown in this first embodiment. The underside of the head is cored out as at 20, to provide a domed configuration with its tinted section being adjacent the juncture of the shank 14 with the head. This provides flexibility to the head in an axial direction as well as providing a perimeter edge or surface 22 capable of sealing with the surface of a work piece. The head further includes a radially extending slot 24 which in the present embodiment extends axially through the head and extends radially from the through bore. As will be seen hereinafter the slot 24 does not have to pass totally through the head but may traverse a substantial portion thereof without penetrating the upper surface of the head 12. This permits the presentation of an aesthetically smooth upper surface to the head as well as enhancing the sealing effect of the rivet.

The shank 14 is bifurcated by an axially extending slot 30 to provide two or more opposed prong sections 32. While the embodiment shown utilizes two prong sections it will be appreciated by those skilled in the art that any multiplicity of prongs can be used. Each of the present prong sections utilize a cylindrical bore 34 which extends through the head 12 and is joined a substantial axial distance from the head by a frustoconical portion 36. If desired the prong sections may further include a slot 38 which functions in accordance with the teachings of the U.S. Pat. No. 4,083,289 in the name of Lloyd Erickson and assigned to the common assignee of the present invention.

The external portion of the prong section are tapered as at 40 to permit ease of entry into an apertured work piece. The tapered 40 terminates in its juncture with a less extreme taper in the balance of the prong 32 to form a shoulder means 42, as is generally common in drive rivets of this type. In this invention, however, each of the prong sections is relieved for a substantial portion of its length from its juncture with the head 12 in direction towards the shoulder 42 by means of a flat 44 and a blending ramp portion 46 which blends out into the circumferential surface of the prong 32. As was previously described the flat 44 on the two prong section are spaced apart a distance substantially less than the diameter of the aperture in the workpiece to which it is to be associated. This provides for a large radial expansion in the aperture as will be described hereinafter.

Within the cylindrical bore 34 there are provided thread engaging means in the form of protuberances or ribs 50. In the preferred embodiment the ribs 50 are spaced axially within the cylindrical bore below the juncture of the thinned section of head 12 with the individual prong 32 and are angularly disposed at an angle equivalent to the pitch of the screw on drive pin 16. As was previously described these ribs preferably have a 90° included angle and are readily accepted in the space between adjacent threads.

The drive pin 16 has a thread formed like a screw that is a modified Acme form of thread that is spaced to accept the ribs 50. The included angle of the side faces in this preferred embodiment of the thread form generally have a 60° included angle but the thread form is spaced when compared with a normal Acme thread. Variations of this thread form such as a buttress or other spaced thread forms could be used with equal facility. The head 18 is illustrated as a hex shaped washer faced head that provides six wrenching flats 60 as well as a cross recess impression 62 capable of accepting complimentary screwdriver. At the opposite end of the drive pins 16 is a frangible connection 64 which initially connects the drive pin 16 to the rivet head 12 during the molding operation. If desired the drive pin 16 can be pre-driven a short distance into the cylindrical bore 34 while the rivet is in the mold to insure positive location as well as to facilitate easy driving by the installer. Such a pre-driving eliminates the possibility of a blow being delivered to the head 18 on an angle and thereby facturing the frangible connection 64 and loss of the drive pin 16. The pre-driving of the drive pin 16 in the mold centers it within the cylindrical bore 34 and facilitates accurate usage.

While the various portions of this device have been described primarily in reference to FIGS. 1 and 2, reference now to FIGS. 2 through 5 shows the effect of installation of the present invention in a pair of panels 70 and 72 which are provided with mutually aligned apertures 74 and 76 respectively. The rivet is telescoped within the apertures 74 and 76 until the edge of the head 22 is in contact with the upper surface of panel 70. The drive pin 16 is then struck a blow in the direction of arrow A to force the pin axially into final mounted position. It will be noted in FIG. 2 that the spacing between opposite relieved flat 44 is substantially less than the diameter of the apertures 74 and 76, while in FIGS. 3 and 4 it can be seen as the drive pin 16 progresses axially into the rivet 10, the flats 44 are moved radially outwardly to prevent the shearing of the ribs 50. With the drive pin 16 progressing into the frustoconical portion, as seen in FIGS. 4 and 5 the lower portion of the prongs carrying the shoulder 42 and the ramp 46 are brought into underlying relationship and engagement with the lower panel 72. When the head 18 bottoms on the top of rivet head 12, as seen in FIG. 5, it places the head 12 under a spring compression and forces the ribs 50 radially inwardly into positive engagement with the threads of drive pin 16. As well as insuring a sealing relationship between the perimetral edge 22 with the upper surface of panel 70. Thus it will be realized that the structure of the present invention is unique in that it provides a clamp force that heretofore was unknown in drive rivets. Additionally, it will be appreciated that the relieved portion 44, ramp 46 and shoulder means 42 provide a wide tolerance for applications to varying panel thicknesses and apertured diameters.

Referring now to FIGS. 6 and 7, wherein similar numerals are utilized with similar parts with the addition of the suffix "a", the rivet 10a in this embodiment includes the normal head 12a, having an enlarged rectangular configuration. When an enlarged head is utilized it is been found desirable to eliminate the "beam" effect by providing one or more notches or relieved portions 70 along each edge to thereby provide the desired flexibility in head 12a and its perimetral surface 22a for the purposes enumerated hereinabove during axial movement of the drive pin 16a as well as to provide a sealing effect between the perimetral edge 22a and the upper surface of the work piece.

This head is also provided with the centrally disposed radially extending slot 24a which in this embodiment includes the thin web covering the slot where it would extend through the upper surface of head 12a. As can be best seen in FIG. 6a, taken along line 6a—6a in FIG. 6, the slot 24a extends through the head portion 12a and communicates with the recessed or domed portion 20a. The upper surface of 12a in the region of the slot 24a is closed by a thin flexible web 74. This does not disturb the functioning or flexibility of the head but provides an aesthetically pleasing appearance to the upper surface of the head 12a. It will also be noted that the recesses 70 do not open through and into the cavity 20a so that the head is a sealing type of head when the perimetral edge 22a contacts the work piece.

Referring now to FIG. 7 the shank 14 is essentially the same as the previous shank with the exception that a shear collar 80 is provided adjacent the juncture of the prong section 32a of the shank 14a. Such a device is normally used with a square aperture with the flats 82 and the opposed flats 84 being spaced substantially the same distance as the across flat of the square aperture. The relieved or side flats 44a are spaced apart less than the size of the square aperture so as to permit the lateral expansion during movement of the drive pin 16a in the same fashion as spelled out here and above for the first embodiment. FIG. 7 clearly shows the axially extending slots 38a which were described in the first embodiment. The use and operation of this embodiment is substantially identical to the first embodiment in that an axially blow is directed to the head 18a to drive the drive pin axially into the bore located between the bore section 32a. Removal is accomplished by rotation of the head 18a.

FIGS. 8 and 9 are merely further examples of the multiplicity of head styles 12b and 12c which can be utilized with devices of this type. They to are relieved on their underside to provide a cavity as well as having the transverse slots 24b and 24c respectively which are closed by the thin web-like portions 74b and 74c respectively, which give an aesthetic appearance to the upper surface of the head as well as providing the necessary sealing function.

Other embodiments will be apparent to those skilled in the art and variations in sizes and configurations of the head style are totally within the purview of the present invention.

All of the devices which have been set forth hereinabove can be formed by injection molding techniques that are well known in the art from suitable plastic materials such as nylon. Rivets of this type can be used for securing guard panels that protect the basic work piece from environmental conditions and can be readily removed for access to the underlaying work piece and readily reinserted and reused by the operators involved.

I claim:
1. A plastic removable drive rivet for acceptance in a predetermined diameter apertured panel, said rivet including a head having a bifurcated shank depending therefrom and a drive pin, an axial bore traversing said head and shank and adapted to accept said drive pin, said head including means to permit axial flexing thereof, said shank having exterior shoulder means intermediate its length, said shank adjacent its juncture with said head being substantially relieved on its outer diameter in quatrature to said bifurcation which permits raidal flexing of said shank, said drive pin including thread means thereon, interrupted complimentary thread means extending into said shank bore and adapted to engage said drive pin thread means, means internally of said bore for engagement with said drive pin to expand said shank at its free end opposite its juncture with said head, and means on said drive pin for rotation thereof to permit removal by engagement of said thread and bore means.

2. A rivet of the type claimed in claim 1 wherein said drive pin is formed integral with said head and connected thereto by a frangible portion at its one end.

3. A rivet of the type claimed in claim 2 wherein said drive pin includes head means at its other end opposite to the frangibly connected end.

4. A rivet of the type claimed in claim 3 wherein said means includes rotation inducing means.

5. A rivet of the type claimed in claim 4 wherein said head includes wrenching flats and an impression for acceptance of a screw driver.

6. A rivet of the type claimed in claim 1 wherein said head is undercut from a perimetral edge toward its juncture with said shank to provide a thinned portion adjacent said juncture which thereby permits axial flexure of said head in the vicinity of said bore.

7. A rivet of the type claimed in claim 6 wherein said thinned portion of said head includes slot means having an axial depth through a substantial portion of said thinned portion and extending radially in opposite directions from said bore and terminating short of opposite perimetral edges, said slot being parallel to and generally coaxial with the bifurcation in said shank and serving as the means in combination with the thinned portion which permits axial flexing of said head.

8. A rivet of the type claimed in claim 7 wherein said slot completely traverses the axial extent of said head.

9. A rivet of the type claimed in claim 7 wherein the upper end of said slot opposite said shank is closed by a thin web of flexible material so that the upper side of said head has a smooth closed appearance.

10. A rivet of the type claimed in claim 1 wherein said relief includes a pair of parallel flats spaced apart a distance substantially less than the diametral measurement of the aperture with which said rivet is to be associated with, whereby upon axial driving of said drive pin and contact with said thread engaging means causes said head to flex to permit said shank to expand radially and thereby allow said threads on said pin to over-ride said thread engaging means and not shear them off, said threads ultimately permitting said thread engaging means to rest in the interstices of said threads.

11. A rivet of the type claimed in claim 10 wherein said drive pin includes head means which ultimately bears on said rivet head and causes the central portion around said bore to flex inwardly which causes the upper end of said bifurcated shank to flex inwardly and thereby to bring said thread engaging means into tight engagement with the threads on said drive pin.

12. A rivet of the type claimed in claim 11 wherein said thread engaging means are ribs which are angularly disposed relative to the axis of the rivet to match the pitch on said threads.

13. A rivet of the type claimed in claim 1 wherein said perimetral edge of said head sealingly engages the surface of the workpiece.

14. A rivet of the type claimed in claim 12 wherein said ribs have an included angle not to exceed 90°.

15. A rivet of the type claimed in claim 14 wherein said thread on said drive pin is a modified space acme thread.

* * * * *